(12) United States Patent
Koh et al.

(10) Patent No.: US 8,349,500 B2
(45) Date of Patent: Jan. 8, 2013

(54) SOLVENT FOR DISSOLVING ELECTROLYTE SALT OF LITHIUM SECONDARY BATTERY

(75) Inventors: Meiten Koh, Settsu (JP); Hideo Sakata, Settsu (JP); Hitomi Nakazawa, Settsu (JP); Akiyoshi Yamauchi, Settsu (JP); Akinori Tani, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 226 days.

(21) Appl. No.: 12/864,778

(22) PCT Filed: Jan. 22, 2009

(86) PCT No.: PCT/JP2009/050964
§ 371 (c)(1),
(2), (4) Date: Jul. 27, 2010

(87) PCT Pub. No.: WO2009/096308
PCT Pub. Date: Aug. 6, 2009

(65) Prior Publication Data
US 2010/0310943 A1  Dec. 9, 2010

(30) Foreign Application Priority Data

Jan. 29, 2008 (JP) .................. 2008-017861
Jun. 5, 2008 (JP) .................. 2008-148166

(51) Int. Cl.
*H01M 6/16* (2006.01)
(52) U.S. Cl. ..................... 429/331; 429/332
(58) Field of Classification Search .......... 429/331, 429/332
See application file for complete search history.

(56) References Cited

U.S. PATENT DOCUMENTS

| | | |
|---|---|---|
| 2004/0038133 A1 | 2/2004 | Yamaguchi et al. |
| 2005/0014072 A1 | 1/2005 | Yamaguchi et al. |
| 2009/0253048 A1 | 10/2009 | Shima |

FOREIGN PATENT DOCUMENTS

| | | |
|---|---|---|
| JP | 07/240232 A | 9/1995 |
| JP | 08-306364 A | 11/1996 |
| JP | 2003-168480 A | 6/2003 |
| JP | 2004-087136 A | 3/2004 |
| JP | 2004-319317 A | 11/2004 |
| JP | 2005-038722 A | 2/2005 |
| JP | 2007-188873 A | 7/2007 |
| JP | 2008-004534 A | 1/2008 |
| KR | 10-0508932 B1 | 3/2004 |
| WO | 2006/132372 A1 | 12/2006 |
| WO | WO 2006/132372 A1 | 12/2006 |

*Primary Examiner* — Jane Rhee
(74) *Attorney, Agent, or Firm* — Sughrue Mion, PLLC

(57) ABSTRACT

There are provided a solvent for dissolving an electrolyte salt of lithium secondary battery comprising at least one fluorine-containing solvent (I) selected from the group consisting of a fluorine-containing ether, a fluorine-containing ester and fluorine-containing chain carbonate, 1,2-dialkyl-1,2-difluoroethylene carbonate (II) and other carbonate (III), a non-aqueous electrolytic solution comprising the solvent and an electrolyte salt, and a lithium secondary battery using the non-aqueous electrolytic solution. The solvent for dissolving an electrolyte salt provides a lithium secondary battery being excellent particularly in discharge capacity, rate characteristic and cycle characteristic and has enhanced incombustibility (safety) and the non-aqueous electrolytic solution comprises the solvent and an electrolyte salt.

12 Claims, 4 Drawing Sheets

SOLVENT FOR DISSOLVING ELECTROLYTE SALT OF LITHIUM SECONDARY BATTERY

TECHNICAL FIELD

The present invention relates to a solvent for dissolving an electrolyte salt of lithium secondary battery, to a non-aqueous electrolytic solution comprising the solvent and an electrolyte salt and to a lithium secondary battery using the non-aqueous electrolytic solution.

BACKGROUND ART

More and more rigorous demands for characteristics of non-aqueous electrolytic solution for lithium secondary battery have been imposed year by year. One of such demands is to solve a problem that metal is precipitated in the form of dendrite on a protective film formed on a metal surface of a negative electrode, thereby causing lowering of rate characteristic and cycle characteristic of a battery in some cases, and in the worst case, resulting in a danger that dendrite reaches a positive electrode surface and causes short circuit and firing.

In order to solve such a problem, there is proposed a method of fluorinating ethylene carbonate being a good solvent for dissolving an electrolyte salt for inhibiting formation of dendrite and improving cycle characteristic (JP7-240232A, JP2003-168480A, JP2004-319317A, JP2007-188873A and JP8-306364A).

Fluorination of ethylene carbonate has been shifted from monofluorination to difluorination for enhancing ability of forming a film (protective film) (JP7-240232A, JP2003-168480A and JP2004-319317A).

However, difluoroethylene carbonate is instable and high in hydrolyzability and therefore, is difficult to use, and synthesis and refining of it is difficult. Also, there is little difference in ability of film formation between difluoroethylene carbonate and monofluoroethylene carbonate. Therefore, the use of difluoroethylene carbonate has not proceeded.

Fluorination of substituted ethylene carbonate is also disclosed (JP2007-188873A and JP8-306364A). In JP2007-188873A, a variety of general formulas are proposed and a lot of compounds are raised as examples thereof, but fluorinated ethylene carbonates actually used in examples are only monofluoroethylene carbonates and difluoroethylene carbonates similar to those of JP7-240232A, JP2003-168480A and JP2004-319317A.

In JP8-306364A, fluoroethylene carbonate having methyl as a substituent is disclosed and is said to have an effect of inhibiting formation of dendrite. However, even in JP8-306364A, fluorinated ethylene carbonate actually used in examples is only one which is 1-methyl-2,2-difluoroethylene carbonate. Also, fluorinated ethylene carbonate is contained in an amount of as much as not less than 10% by volume, preferably not less than 30% by volume.

Also, further enhancement of safety (for example, incombustibility and breaking resistance) at over-charging is demanded.

DISCLOSURE OF INVENTION

It is an object of the present invention to provide a solvent for non-aqueous electrolytic solution which gives a lithium secondary battery being excellent particularly in discharge capacity, rate characteristic and cycle characteristic and has enhanced incombustibility (safety), a non-aqueous electrolytic solution comprising the solvent, and a lithium secondary battery.

The present invention relates to a solvent for dissolving an electrolyte salt of a lithium secondary battery comprising at least one fluorine-containing solvent (I) selected from the group consisting of a fluorine-containing ether (IA), a fluorine-containing ester (IB) and a fluorine-containing chain carbonate (IC), 1,2-dialkyl-1,2-difluoroethylene carbonate (II) and other carbonate (III).

From the viewpoint of enhancing safety, it is preferable that the fluorine-containing solvent (I) is at least one selected from the group consisting of:
a fluorine-containing ether represented by the formula (IA):

wherein $Rf^1$ is a fluorine-containing alkyl group having 3 to 6 carbon atoms, $Rf^2$ is a fluorine-containing alkyl group having 2 to 6 carbon atoms,
a fluorine-containing ester represented by the formula (IB):

wherein $Rf^3$ is an alkyl group which has 1 to 2 carbon atoms and may have fluorine atom, $Rf^4$ is an alkyl group which has 1 to 4 carbon atoms and may have fluorine atom, at least either $Rf^3$ or $Rf^4$ is a fluorine-containing alkyl group, and
a fluorine-containing chain carbonate represented by the formula (IC):

wherein $Rf^5$ is a fluorine-containing alkyl group having 1 to 4 carbon atoms, $Rf^6$ is an alkyl group which has 1 to 4 carbon atoms and may have fluorine atom.

From the viewpoint of good rate characteristic and cycle characteristic, it is preferable that the other carbonate (III) is a non-fluorine-containing cyclic carbonate (IIIA) and a non-fluorine-containing chain carbonate (IIIB).

From the viewpoint of good cycle characteristic, it is preferable that the non-fluorine-containing cyclic carbonate (IIIA) is one of ethylene carbonate and propylene carbonate or a mixture thereof.

From the viewpoint of good rate characteristic, it is preferable that the non-fluorine-containing chain carbonate (IIIB) is one of dimethyl carbonate, methyl ethyl carbonate and diethyl carbonate or a mixture thereof.

From the viewpoint of low viscosity, the 1,2-dialkyl-1,2-difluoroethylene carbonate (II) is preferably 1,2-dimethyl-1,2-difluoroethylene carbonate.

Also, there are trans-form and cis-form of 1,2-dialkyl-1,2-difluoroethylene carbonate (II), and both of them exhibit an effect of decreasing resistance and an effect of improving safety due to an effect in film formation on an electrode.

From the viewpoint of improving safety, it is preferable that assuming that the total amount of (I), (II) and (III) is 100% by volume, the fluorine-containing ether (I) is contained in an amount of from 10 to 60% by volume and the 1,2-dialkyl-1,2-difluoroethylene carbonate (II) is contained in an amount of not more than 30% by volume.

From the viewpoint of enhancement of safety and good battery characteristics, it is preferable that assuming that the total amount of (I), (II), (IIIA) and (IIIB) is 100% by volume, (I) is contained in an amount of from 10 to 60% by volume, (II) is contained in an amount of from 0.1 to 10% by volume, (IIIA) is contained in an amount of from 10 to 50% by volume, further preferably from 10 to 40% by volume and (IIIB) is contained in an amount of from 0 to 79.9% by volume.

The present invention also relates to a non-aqueous electrolytic solution of a lithium secondary battery comprising the above-mentioned solvent for dissolving an electrolyte salt and an electrolyte salt.

The present invention further relates to a lithium secondary battery using the non-aqueous electrolytic solution of the present invention.

EXPLANATION OF SYMBOLS

Figure 1:
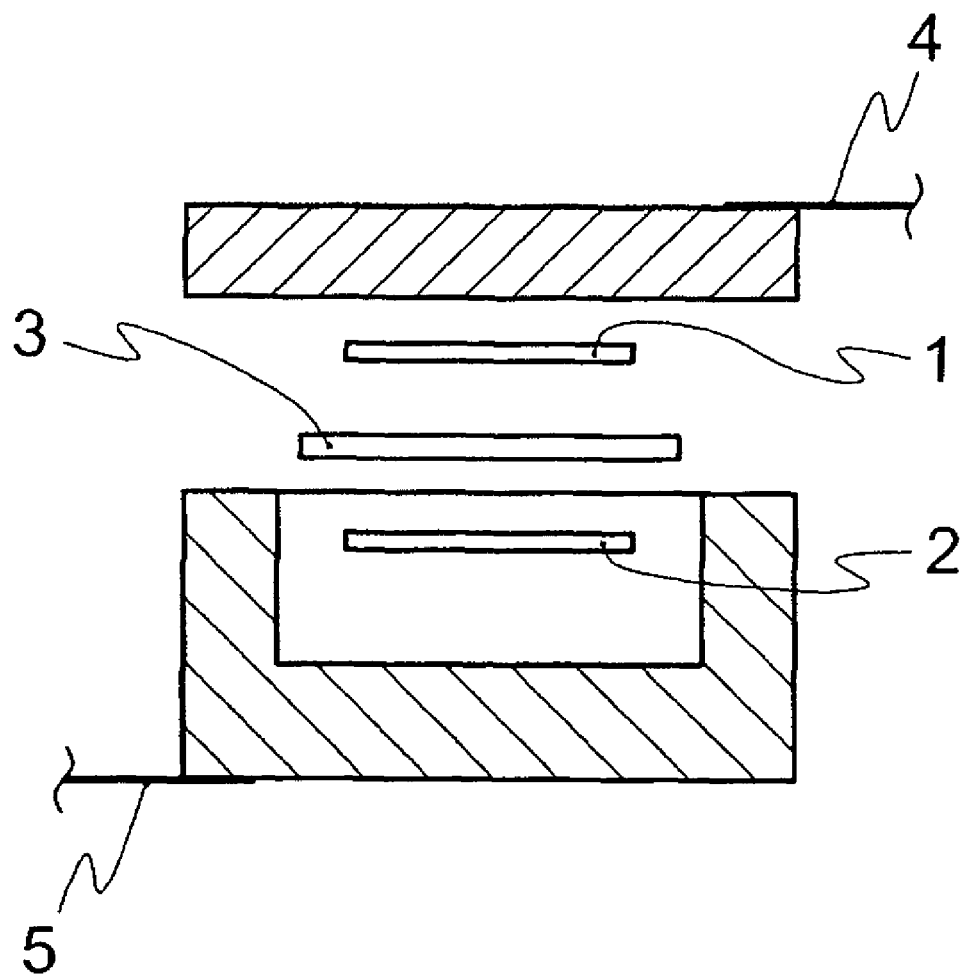
FIG. 1 is a diagrammatic longitudinal cross-sectional view of the bipolar cell prepared in Test 1.

1 Positive electrode
2 Negative electrode
3 Separator
4 Terminal of positive electrode
5 Terminal of negative electrode
6 Aluminum-laminated casing

BEST MODE FOR CARRYING OUT THE INVENTION

The solvent for dissolving an electrolyte salt of the present invention comprises the fluorine-containing solvent (I), 1,2-dialkyl-1,2-difluoroethylene carbonate (II) and other carbonate (III).

Each component and proportions thereof are explained below.

(I) Fluorine-containing solvent (at least one selected from the group consisting of the fluorine-containing ether (IA), fluorine-containing ester (IB) and fluorine-containing chain carbonate (IC))

By containing the fluorine-containing solvent (I), there can be obtained an action of giving flame retardancy of the electrolytic solution, an action of improving low-temperature characteristics, and an effect of improving rate characteristic and oxidation resistance.

Examples of the fluorine-containing ether (IA) are compounds described in JP8-037024A, JP9-097627A, JP11-026015A, JP2000-294281A, JP2001-052737A, JP11-307123A, etc.

Particularly the fluorine-containing ethers represented by the formula (IA):

$$Rf^1ORf^2$$

wherein $Rf^1$ is a fluorine-containing alkyl group having 3 to 6 carbon atoms, $Rf^2$ is a fluorine-containing alkyl group having 2 to 6 carbon atoms, are preferred from the viewpoint of good compatibility with other solvents and proper boiling point.

Examples of $Rf^1$ are fluorine-containing alkyl groups having 3 to 6 carbon atoms such as $HCF_2CF_2CH_2-$, $HCF_2CF_2CF_2CH_2-$, $HCF_2CF_2CF_2CF_2CH_2-$, $CF_3CF_2CH_2-$, $CF_3CFHCF_2CH_2-$, $HCF_2CF(CF_3)CH_2-$, $CF_3CF_2CH_2CH_2-$ and $CF_3CH_2CH_2-O-$, and examples of $Rf^2$ are fluorine-containing alkyl groups having 2 to 6 carbon atoms such as $-CF_2CF_2H$, $-CF_2CFHCF_3$, $-CF_2CF_2CF_2H$, $-CH_2CH_2CF_3$, $-CH_2CFHCF_3$ and $-CH_2CH_2CF_3$. It is particularly preferable that $Rf^1$ is ether having 3 to 4 carbon atoms and $Rf^2$ is a fluorine-containing alkyl group having 2 to 3 carbon atoms, from the viewpoint of satisfactory ionic conductivity.

Examples of the fluorine-containing ether (IA) are one or two or more of $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $HCF_2CF_2CH_2OCH_2CFHCF_3$ and $CF_3CF_2CH_2OCH_2CFHCF_3$, and among these, from the viewpoint of good compatibility with other solvents and satisfactory rate characteristic, $HCF_2CF_2CH_2OCF_2CF_2H$, $CF_3CF_2CH_2OCF_2CF_2H$, $HCF_2CF_2CH_2OCF_2CFHCF_3$ and $CF_3CF_2CH_2OCF_2CFHCF_3$ are especially preferred.

Preferred examples of the fluorine-containing ester (IB) are the fluorine-containing esters represented by the formula (IB):

$$Rf^3COORf^4$$

wherein $Rf^3$ is an alkyl group which has 1 to 2 carbon atoms and may have fluorine atom, $Rf^4$ is an alkyl group which has 1 to 4 carbon atoms and may have fluorine atom, at least either $Rf^3$ or $Rf^4$ is a fluorine-containing alkyl group, from the viewpoint of high flame retardancy and good compatibility with other solvents.

Examples of $Rf^3$ are $HCF_2-$, $CF_3-$, $CF_3CF_2-$, $HCF_2CF_2-$, $HCF_2-$, $CH_3CF_2-$, $CF_3CH_2-$, $CH_3-$ and $CH_3CH_2-$, and among these, from the viewpoint of satisfactory rate characteristic, $CF_3-$, $HCF_2-$, and $CF_3-$ are especially preferred.

Examples of $Rf^4$ are fluorine-containing alkyl groups such as $-CF_3$, $-CF_2CF_3$, $-CH_2CF_3$, $-CH_2CH_2CF_3$, $-CH(CF_3)_2$, $-CH_2CF_2CFHCF_3$, $-CH_2C_2F_5$, $-CH_2CF_2CF_2H$, $-CH_2CH_2C_2F_5$, $-CH_2CF_2CF_3$, $-CH_2CF_2CF_2H$, and $-CH_2CF_2CF_2CF_3$, and non-fluorine-containing alkyl groups such as $-CH_3$, $-C_2H_5$, $-C_3H_7$ and $-CH(CH_3)CH_3$, and among these, from the viewpoint of good compatibility with other solvents, $-CH_2CF_3$, $-CH_2C_2F_5$, $-CH(CF_3)_2$, $-CH_2CF_2CF_2H$, $-CH_3$ and $-C_2H_5$ are especially preferred.

Examples of the fluorine-containing ester (IB) are one or two or more of:

1. fluorine-containing esters, in which both of $Rf^3$ and $Rf^4$ are fluorine-containing alkyl groups:
$CF_3C(=O)OCH_2CF_3$, $CF_3C(=O)OCH_2CF_2CF_3$, $CF_3C(=O)OCH_2CF_2CF_2H$, $HCF_2C(=O)OCH_2CF_3$, $HCF_2C(=O)OCH_2CF_2CF_3$, $HCF_2C(=O)OCF_2CF_2H$ 2. fluorine-containing esters, in which $Rf^3$ is a fluorine-containing alkyl group:
$CF_3C(=O)OCH_3$, $CF_3C(=O)OCH_2CH_3$, $HCF_2C(=O)OCH_3$, $HCF_2C(=O)OCH_2CH_3$, $CH_3CF_2C(=O)OCH_3$, $CH_3CF_2C(=O)OCH_2CH_3$, $CF_3CF_2C(=O)OCH_3$, $CF_3CF_2C(=O)OCH_2CH_3$ 3. fluorine-containing esters, in which $Rf^4$ is a fluorine-containing alkyl group:
$CH_3C(=O)OCH_2CF_3$, $CH_3C(=O)OCH_2CF_2CF_3$, $CH_3C(=O)OCH_2CF_2CF_2H$, $CH_3CH_2C(=O)OCH_2CF_3$, $CH_3CH_2C(=O)OCH_2CF_2CF_3$, $CH_3CH_2C(=O)OCH_2CF_2CF_2H$, and among these, the above-mentioned 2. fluorine-containing esters, in which $Rf^3$ is a fluorine-containing alkyl group and 3. fluorine-containing esters, in which $Rf^4$ is a fluorine-containing alkyl group are preferred. Among these, $CF_3C(=O)OCH_3$, $CF_3C(=O)OCH_2CH_3$, $HCF_2C(=O)OCH_3$, $HCF_2C(=O)OCH_2CH_3$, $CH_3C(=O)OCH_2CF_3$ and $CH_3C(=O)OCH_2CF_2CF_3$ are especially preferred from the viewpoint of good compatibility with other solvents and satisfactory rate characteristic.

Preferred examples of the fluorine-containing chain carbonate (IC) are fluorine-containing chain carbonates represented by the formula (IC):

wherein $Rf^5$ is a fluorine-containing alkyl group having 1 to 4 carbon atoms, $Rf^6$ is an alkyl group which has 1 to 4 carbon atoms and may have fluorine atom, from the viewpoint of high flame retardancy and satisfactory rate characteristic.

Examples of $Rf^5$ are $CF_3$—, $C_2F_5$—, $(CF_3)_2CH$—, $CF_3CH_2$—, $C_2F_5CH_2$—, $HCF_2CF_2CH_2$— and $CF_2CFHCF_2CH_2$—, and examples of $Rf^6$ are fluorine-containing alkyl groups such as $CF_3$—, $C_2F_5$—, $(CF_3)_2CH$—, $CF_3CH_2$—, $C_2F_5CH_2$—, $HCF_2CF_2CH_2$— and $CF_2CFHCF_2CH_2$— and non-fluorine-containing alkyl groups such as —$CH_3$, —$C_2H_5$, —$C_3H_7$ and —$CH(CH_3)CH_3$. Among these, especially preferred $Rf^5$ are $CF_3CH_2$— and $C_2F_5CH_2$—, and especially preferred $Rf^6$ are $CF_3CH_2$—, $C_2F_5CH_2$—, —$CH_3$ and —$C_2H_5$, from the viewpoint of proper viscosity, good compatibility with other solvents and satisfactory rate characteristic.

Examples of the fluorine-containing chain carbonate (IC) are one or two or more of fluorine-containing chain carbonates such as $CF_3CH_2OCOOCH_2CF_3$, $CF_3CF_2CH_2OCOOCH_2CF_2CF_3$, $CF_3CF_2CH_2OCOOCH_3$, $CF_3CH_2OCOOCH_3$, $CF_3CH_2OCOOCH_3$ and $CF_3CH_2OCOOCH_2CH_3$, and among these, from the viewpoint of proper viscosity, high flame retardancy, good compatibility with other solvents and satisfactory rate characteristic, $CF_3CH_2OCOOCH_2CF_3$, $CF_3CF_2CH_2OCOOCH_2CF_2CF_3$, $CF_3CH_2OCOOCH_3$ and $CF_3CH_2OCOOCH_2CH_3$ are especially preferred. Also, there can be exemplified compounds described, for example, in JP6-21992A, JP2000-327634A and JP2001-256983A.

Among the fluorine-containing solvents (I), the fluorine-containing ether (IA) and the fluorine-containing carbonate (IC) are preferred from the viewpoint of proper viscosity, good solubility of an electrolyte salt and satisfactory rate characteristic, and especially the fluorine-containing ether (IA) is preferred from the viewpoint of satisfactory cycle characteristic.

The fluorine-containing ether (IA), the fluorine-containing ester (IB) and the fluorine-containing chain carbonate (IC) may be used alone or may be used in combination thereof. In the case of combination use, a combination of (IA) and (IB) and a combination of (IA) and (IC) are preferred from the viewpoint of low viscosity and good compatibility with other solvents.

It is preferable that assuming that the total amount of (I), (II) and (III) is 100% by volume, the fluorine-containing solvent (I) is contained in an amount of from 10 to 60% by volume, from the viewpoint of being excellent in an action of giving flame retardancy of the electrolytic solution, an action of improving low-temperature characteristics, and an effect of improving rate characteristic and oxidation resistance. Further, it is preferable that the fluorine-containing solvent (I) is contained in an amount of from 20 to 60% by volume, further from 30 to 50% by volume, especially from 30 to 45% by volume since safety is especially enhanced.

(II) 1,2-dialkyl-1,2-difluoroethylene Carbonate

This is encompassed in the category of fluorine-containing cyclic carbonates, and is ethylene carbonate in which the first position is substituted by fluorine atom and alkyl group and also the second position is substituted by fluorine atom and alkyl group. Alkyl groups of the first position and the second position may be the same or different. From the viewpoint of low viscosity, alkyl groups having 1 to 3 carbon atoms such as methyl, ethyl and propyl are preferred as an alkyl group.

Examples thereof are 1,2-dimethyl-1,2-difluoroethylene carbonate, 1,2-diethyl-1,2-difluoroethylene carbonate, 1-methyl-2-ethyl-1,2-difluoroethylene carbonate, and the like, and especially from the viewpoint of low viscosity, 1,2-dimethyl-1,2-difluoroethylene carbonate is preferred.

There are 1,2-dialkyl-1,2-difluoroethylene carbonates (II) of trans-form and cis-form, and the both exhibit an effect of decreasing resistance and an effect of improving safety due to an effect in film formation on an electrode. Oxidation potential of cis-form is higher than that of trans-form.

1,2-dialkyl-1,2-difluoroethylene carbonates (II) of trans-form and cis-form are novel compounds, and can be prepared, for example, by the following methods.

(1) Carbonyl difluoride is allowed to react with a diketone compound represented by the formula (1):

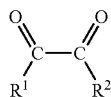

wherein $R^1$ and $R^2$ are the same or different and each is an alkyl group, in a solvent in the presence of a base to synthesize a mixture of cis-form and trans-form, and then separating cis-form and trans-form by fractional distillation.

(2) Dichlorinated carbonyl is allowed to react with the diketone compound represented by the formula (I) to synthesize 1,2-dialkyl-1,2-dichloroethylene carbonate. The obtained 1,2-dialkyl-1,2-dichloroethylene carbonate is formed into a trans-form due to steric hindrance of chlorine atom, and this trans-form is allowed to react with a fluorinating agent (potassium fluoride) or fluorine gas to obtain trans-1,2-dialkyl-1,2-difluoroethylene carbonate.

As compared with analogous fluorine-containing ethylene carbonates, for example, monofluoroethylene carbonates such as monofluoroethylene carbonate and dialkyl monofluoroethylene carbonate, this 1,2-dialkyl-1,2-difluoroethylene carbonate (II) exhibits effects of improving discharge capacity, rate characteristic and cycle characteristic of a lithium secondary battery and an effect of decreasing resistance, and is excellent in safety due to formation of a film on an electrode. Also, as compared with other difluoroethylene carbonates such as difluoroethylene carbonate and difluoromonoalkylethylene carbonate, this 1,2-dialkyl-1,2-difluoroethylene carbonate is hardly hydrolyzed, exhibits effects of improving discharge capacity, rate characteristic and cycle characteristic of a lithium secondary battery and an effect of decreasing resistance, and is excellent in safety due to an effect in film formation on an electrode. Among these, cis-1,2-dialkyl-1,2-difluoroethylene carbonate is most excellent since it gives large discharge capacity, good rate characteristic and cycle characteristic to a lithium secondary battery and also has a large effect in film formation on an electrode.

It is preferable that assuming that the total amount of (I), (II) and (III) is 100% by volume, the 1,2-dialkyl-1,2-difluoroethylene carbonate (II) is contained in an amount of not more than 30% by volume. When the amount of component (II) is larger than the mentioned amount, discharge capacity tends to be lowered. The component (II) can exhibit its effect in a relatively small amount. Its amount is preferably not more than 10% by volume. An effective lower limit is preferably 0.1% by volume, further preferably 0.5% by volume.

It can be considered that the 1,2-dialkyl-1,2-difluoroethylene carbonate (II) helps to form a film of good quality especially on a negative electrode, and as a result, resistance is reduced. Accordingly, when a carbonaceous material such as graphite is used on a negative electrode, assuming that the total amount of (I), (II) and (III) is 100% by volume, the amount of (II) is especially preferably 5% by volume or less. When an alloy material is used on a negative electrode, the amount of (II) is preferably less than 10% by volume since a film being thicker than a carbonaceous material is necessary.

(III) Other carbonate

In the present invention, known other carbonates are blended in addition to (I) and (II). Any of chain carbonates, cyclic carbonates, fluorine-containing carbonates and non-fluorine-containing carbonates may be used as other carbonates except the fluorine-containing chain carbonate (IC) and the 1,2-dialkyl-1,2-difluoroethylene carbonate (II). From the viewpoint of good low-temperature characteristics and cycle characteristic, the non-fluorine-containing cyclic carbonate (IIIA) and the non-fluorine-containing chain carbonate (IIIB) are preferred.

(IIIA) Non-Fluorine-Containing Cyclic Carbonate

Examples of the non-fluorine-containing cyclic carbonate (IIIA) are one or two or more of ethylene carbonate, propylene carbonate, butylene carbonate, vinyl ethylene carbonate and the like. Among these, ethylene carbonate (EC) and propylene carbonate (PC) are preferred for the electrolytic solution of the present invention since they are high in dielectric constant and especially excellent in ability of dissolving an electrolyte salt.

This non-fluorine-containing cyclic carbonate has characteristics of improving rate characteristic and dielectric constant in addition to excellent ability of dissolving an electrolyte salt.

Also, it is possible to blend vinylene carbonate or monofluoroethylene carbonate as an additional (optional) component for improving cycle characteristic. The amount thereof is desirably 0.1 to 10% by volume based on the whole electrolytic solution.

(IIIB) Non-Fluorine-Containing Chain Carbonate

Examples of the non-fluorine-containing chain carbonate (IIIB) are one or two or more of hydrocarbon chain carbonates, for example, $CH_3CH_2OCOOCH_2CH_3$ (diethyl carbonate: DEC), $CH_3CH_2OCOOCH_3$ (methyl ethyl carbonate: MEC), $CH_3OCOOCH_3$ (dimethyl carbonate: DMC) and $CH_3OCOOCH_2CH_3$ (methyl propyl carbonate). Among these, DEC, MEC and DMC are preferred from the viewpoint of low viscosity and good low-temperature characteristics.

Assuming that the total amount of (I), (II) and (III) is 100% by volume, the amount of non-fluorine-containing cyclic carbonate (IIIA) is preferably 10 to 40% by volume, and the amount of non-fluorine-containing chain carbonate (IIIB) is preferably 0 to 79.9% by volume, from the viewpoint of further improvement in safety and good battery characteristics.

When the amount of non-fluorine-containing cyclic carbonate (IIIA) is too large, compatibility with other components is lowered and in some cases, phase separation from other components is caused under low temperature atmosphere (for example, −30° C. to −20° C.), especially at an outside air temperature in wintertime and at an inside temperature in a refrigerator. From this point of view, a preferred upper limit of the amount is 35% by volume, further 30% by volume. On the contrary, when the amount of non-fluorine-containing cyclic carbonate (IIIA) is too small, solubility of an electrolyte salt of the whole solvents is lowered, and a desired concentration of an electrolyte salt (0.8 mole/liter or higher) cannot be achieved.

In addition, since the non-fluorine-containing chain carbonate (IIIB) is low in viscosity, there is exhibited an effect of improving low-temperature characteristics. Accordingly, when low-temperature characteristics need to be improved, (IIIB) is blended in a proper amount. However, it is desirable to blend (IIIB) to an extent not to impair safety of a battery since its flash point is relatively low.

From the viewpoint mentioned above, a preferred solvent for dissolving an electrolyte salt is one comprising 10 to 60% by volume of the fluorine-containing solvent (I), especially the fluorine-containing ether (IA), 10 to 50% by volume of the non-fluorine-containing cyclic carbonate (IIIA), 0 to 79.9% by volume of the non-fluorine-containing chain carbonate (IIIB) and 0.1 to 10% by volume of the 1,2-dialkyl-1,2-difluoroethylene carbonate (II), assuming that the total amount of (I), (II), (IIIA) and (IIIB) is 100% by volume.

The problem to be solved by the present invention can be solved by the solvent for dissolving an electrolyte salt of the present invention comprising the components (I), (II) and (III) only, and a known other solvent may be blended thereto as a solvent for dissolving an electrolyte salt. However, kind and amount of other solvent need be selected not to cause hindrance in solving the problem in the present invention.

The present invention also relates to the non-aqueous electrolytic solution for a lithium secondary battery comprising the solvent for dissolving an electrolyte salt of the present invention and an electrolyte salt.

Examples of the electrolyte salt to be used for the non-aqueous electrolytic solution of the present invention are $LiClO_4$, $LiAsF_6$, $LiBF_4$, $LiPF_6$, $LiN(SO_2CF_3)_2$, $LiN(SO_2C_2F_5)_2$ and the like, and from the viewpoint of good cycle characteristic, $LiPF_6$, $LiBF_4$, $LiN(SO_2CF_3)_2$, $LiN(SO_2C_2F_5)_2$ and a combination thereof are especially preferred.

In order to secure practical performance of the lithium secondary battery, the concentration of the electrolyte salt of not less than 0.5 mole/liter, further not less than 0.8 mole/liter is demanded. An upper limit is usually 1.5 mole/liter. The solvent for dissolving an electrolyte salt of the present invention has ability of dissolving an electrolyte salt at a concentration satisfying these requirements.

To the non-aqueous electrolytic solution of the present invention may be added additives such as a flame retardant, a surfactant, an additive for increasing dielectric constant, cycle characteristic and rate characteristic improver and further other additives for improvement of safety without deviation from the specified volume percentages of the components (I), (II) and (III) to an extent not to impair the effect of the present invention.

With respect to a flame retardant, known flame retardants can be used. Especially phosphoric ester may be added to impart incombustibility (non-ignition property). Ignition can be prevented by mixing phosphoric ester in an amount of from 1 to 10% by volume based on the solvent for dissolving an electrolyte salt.

Examples of the phosphoric ester are fluorine-containing alkylphosphoric ester, non-fluorine-containing alkylphosphoric ester and arylphosphoric ester, and fluorine-containing alkylphosphoric ester is preferred since it highly contributes to make the electrolytic solution nonflammable and an effect of making the electrolytic solution nonflammable is increased even if its amount is small.

Examples of the fluorine-containing alkylphosphoric ester are fluorine-containing dialkylphosphoric esters disclosed in JP11-233141A, cyclic alkylphosphoric esters disclosed in JP11-283669A, and fluorine-containing trialkylphosphoric esters.

Since the fluorine-containing trialkylphosphoric esters have high capability of giving incombustibility and satisfactory compatibility with the components (I), (II) and (III), the amount thereof can be decreased, and even when the amount is from 1 to 8% by volume, further from 1 to 5% by volume, ignition can be prevented.

Preferred examples of fluorine-containing trialkylphosphoric esters are those represented by the formula: $(RfO)_3-P=O$, wherein Rf is $CF_3-$, $CF_3CF_2-$, $CF_3CH_2-$, $HCF_2CF_2-$ or $CF_3CFHCF_2-$. Especially, tri-2,2,3,3,3-pentafluoropropyl phosphate and tri-2,2,3,3-tetrafluoropropyl phosphate are preferred.

Further, fluorine-containing cyclic carbonate, fluorine-containing lactone and fluorine-containing sulfolane can also be exemplified as a flame retardant. Examples of fluorine-containing cyclic carbonate as a flame retardant are fluorine-containing cyclic carbonates (excluding the component (II)) represented by:

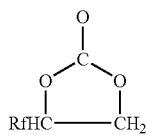

wherein Rf is a fluorine-containing alkyl group which has 1 to 9 carbon atoms and may have ether bond.

A surfactant may be added in order to improve capacity property and rate characteristic.

Any of cationic surfactants, anionic surfactants, nonionic surfactants and amphoteric surfactants may be used as a surfactant, and fluorine-containing surfactants are preferred from the viewpoint of good cycle characteristic and rate characteristic.

For example, there are exemplified fluorine-containing carboxylates and fluorine-containing sulfonates.

Examples of fluorine-containing carboxylates are $HCF_2C_2F_6COO^-Li^+$, $C_4F_9COO^-Li^+$, $C_5F_{11}COO^-Li^+$, $C_6F_{13}COO^-Li^+$, $C_7F_{15}COO^-Li^+$, $C_8F_{17}COO^-Li^+$, $HCF_2C_2F_6COO^-NH_4^+$, $C_4F_9COO^-NH_4^+$, $C_5F_{11}COO^-NH_4^+$, $C_6F_{13}COO^-NH_4^+$, $C_7F_{15}COO^-NH_4^+$, $C_8F_{17}COO^-NH_4^+$, $HCF_2C_2F_6COO^-NH(CH_3)_3^+$, $C_4F_9COO^-NH(CH_3)_3^+$, $C_5F_{11}COO^-NH(CH_3)_3^+$, $C_6F_{13}COO^-NH(CH_3)_3^+$, $C_7F_{15}COO^-NH(CH_3)_3^+$, $C_8F_{17}COO^-NH(CH_3)_3^+$, and the like. Examples of fluorine-containing sulfonates are $C_4F_9SO_3^-Li^+$, $C_6F_{13}SO_3^-Li^+$, $C_8F_{17}SO_3^-Li^+$, $C_4F_9SO_3^-NH_4^+$, $C_6F_{13}SO_3^-NH_4^+$, $C_8F_{17}SO_3^-NH_4^+$, $C_4F_9SO_3^-NH(CH_3)_3^+$, $C_6F_{13}SO_3^-NH(CH_3)_3^+$, $C_8F_{17}SO_3^-NH(CH_3)_3^+$, and the like.

The amount of surfactant is preferably from 0.01 to 2% by mass based on the whole solvents for dissolving the electrolyte salt from the viewpoint of decreasing a surface tension of the electrolytic solution without lowering charge-discharge cycle characteristic.

Examples of an additive for increasing dielectric constant are sulfolane, methyl sulfolane, γ-butyrolactone, γ-valerolactone, acetonitrile, propionitrile and the like.

Examples of an overcharging inhibitor are hexafluorobenzene, fluorobenzene, cyclohexylbenzene, dichloroaniline, difluoroaniline, toluene, and the like.

For improving rate characteristic, tetrahydrofuran, silicate compounds and the like are effective.

The present invention also relates to the lithium secondary battery using the non-aqueous electrolytic solution of the present invention. The lithium secondary battery of the present invention is provided with a positive electrode, a negative electrode, a separator and the electrolytic solution of the present invention, and it is especially preferable that an active material for the positive electrode to be used on the positive electrode is at least one selected from the group consisting of cobalt compound oxides, nickel compound oxides, manganese compound oxides, iron compound oxides and vanadium compound oxides, since a high output lithium secondary battery having high energy density is obtained.

Example of cobalt compound oxide is $LiCoO_2$, example of nickel compound oxide is $LiNiO_2$, and example of manganese compound oxide is $LiMnO_2$. Also, there may be used compound oxides of CoNi represented by $LiCo_xNi_{1-x}O_2$ (0<x<1), compound oxides of CoMn represented by $LiCo_xMn_{1-x}O_2$ (0<x<1), compound oxides of NiMn represented by $LiNi_xMn_{1-x}O_2$ (0<x<1) and $LiNi_xMn_{2-x}O_4$ (0<x<2) and compound oxides of NiCoMn represented by $LiNi_{1-x-y}Co_xMn_yO_2$ (0<x<1, 0<y<1, 0<x+y<1). In these lithium-containing compound oxides, a part of metal elements such as Co, Ni and Mn may be replaced by at least one metal element such as Mg, Al, Zr, Ti or Cr.

Examples of iron compound oxide are $LiFeO_2$ and $LiFePO_4$, and example of vanadium compound oxide is $V_2O_5$.

Among the above-mentioned compound oxides, nickel compound oxides or cobalt compound oxides are preferred as an active material for a positive electrode from the viewpoint that capacity can be made high. Especially in a small size lithium ion secondary battery, the use of cobalt compound oxides is desirable from the viewpoint of high energy density and safety.

In the present invention, especially for the uses on large size lithium secondary batteries for hybrid cars and distributed power source, since high output is demanded, it is preferable that particles of an active material for a positive electrode mainly comprise secondary particles, and an average particle size of the secondary particles is not more than 40 μm and fine particles having an average primary particle size of not more than 1 μm are contained in an amount of from 0.5 to 7.0% by volume.

When fine particles having an average primary particle size of not more than 1 μm are contained, an area thereof coming into contact with an electrolytic solution is increased and lithium ion can be scattered more rapidly between the electrode and the electrolytic solution, thereby enabling output performance to be improved.

Examples of an active material to be used on a negative electrode in the present invention are carbon materials, and in addition, metallic oxides and metallic nitrides to which lithium ion can be inserted. Examples of carbon materials are natural graphite, artificial graphite, pyrocarbon, coke, mesocarbon microbeads, carbon fiber, activated carbon and pitch-coated graphite. Examples of metallic oxides to which lithium ion can be inserted are metallic compounds containing tin, silicon or titanium, for example, tin oxide, silicon oxide and lithium titanate, and examples of metallic nitrides are $Li_{2.6}Co_{0.4}N$, etc.

A separator which can be used in the present invention is not limited particularly, and there are exemplified microporous polyethylene films, microporous polypropylene films, microporous ethylene-propylene copolymer films, microporous polypropylene/polyethylene two-layer films, microporous polypropylene/polyethylene/polypropylene three-layer films, etc. A separator which can be used in the present invention is not limited particularly, and there are exemplified microporous polyethylene films, microporous polypropylene films, microporous ethylene-propylene copolymer films, microporous polypropylene/polyethylene two-layer films, microporous polypropylene/polyethylene/polypropylene three-layer films, etc. Also, there are films prepared by coating aramid resin on a separator or films prepared by coating a resin comprising polyamide imide and alumina filler on a separator for the purpose of enhancing safety such as prevention of short-circuit due to Li dendrite (cf., for example, JP2007-299612A and JP2007-324073A).

The lithium secondary battery of the present invention are useful as a large size lithium secondary battery for hybrid cars and distributed power source, and in addition, are useful as a small size lithium secondary battery for mobile phone and portable remote terminal.

EXAMPLE

The present invention is then explained by means of examples, but the present invention is not limited to them.

Compounds used in the following examples and comparative examples are as follows.

Component (I)
   (IA-1): $HCF_2CF_2CH_2OCF_2CF_2H$
   (IA-2): $HCF_2CF_2CH_2OCF_2CFHCF_3$
   (IA-3): $CF_3CF_2CH_2OCF_2CF_2H$
   (IB-1): $CF_3COOCH_2CF_2CF_2H$
   (IC-1): $CF_3CH_2OCOOCH_2CF_3$ Component (II)
   (IIA): cis-1,2-dimethyl-1,2-difluoroethylene carbonate
   (IIB): trans-1,2-dimethyl-1,2-difluoroethylene carbonate
   (IIC): cis-1,2-diethyl-1,2-difluoroethylene carbonate Component (IIIA)
   (IIIA-1): Ethylene carbonate
   (IIIA-2): Propylene carbonate Component (IIIB)
   (IIIB-1): Dimethyl carbonate
   (IIIB-2): Methyl ethyl carbonate
   (IIIB-3): Diethyl carbonate Component (IV)
   (IVA): 1,1-difluoroethylene carbonate Electrolyte salt (V)
   (VA): $LiPF_6$
   (VB): $LiN(O_2SCF_3)_2$
   (VC): $LiN(O_2SC2F_5)_2$
   (VD): $LiBF_4$ NMR and IR measurements are carried out as follows.

(1) NMR
Equipment: AC-300 available from BRUKER
Measuring Conditions:
   $^{19}$F-NMR: 282 MHz (trifluoromethylbenzene=−62.3 ppm)
   $^{1}$H-NMR: 300 MHz (trifluoromethylbenzene=7.51 ppm)

(2) Infrared Spectroscopic Analysis (IR)
Measurement is carried out at room temperature with Fourier-transform infrared spectrophotometer 1760X available from Perkin Elmer Co., Ltd.

Synthesis Example 1

Synthesis of 1,2-Dimethyl-1,2-Difluoroethylene Carbonate

Reaction was carried out using a 3-liter SUS stainless steel autoclave. Into a reactor were added 2,3-butanedion (300 g, 3.48 mol) of the formula:

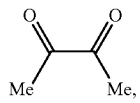

pyridine (138 g, 1.74 mol) and dichloromethane (1 liter), followed by stirring. Then, carbonyl difluoride of the formula:

was introduced at room temperature at 0.1 to 0.5 MPa. It was confirmed that the reaction was followed by heat generation up to 46.2° C. Thereafter, introduction of carbonyl difluoride was continued until heat generation and decrease of pressure could not be recognized, and proceeding of the reaction was traced with GC. After confirming that 2,3-butanedion as the starting material had disappeared, the reaction was terminated. After completion of the reaction, carbonyl difluoride remaining in the system was purged and then the following post-treatment was carried out. First, the reaction solution was subjected to quenching several times with 1-liter of pure water. Then, an organic layer of the bottom layer was collected and was subjected to quenching again with 1 liter of 1N HCl solution to remove the remaining pyridine. After the quenching, drying was conducted with $MgSO_4$ and the filtrated solution was condensed with an evaporator. In this case, trans-form of the formula:

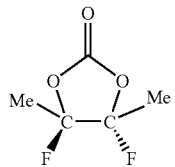

and cis-form of the formula:

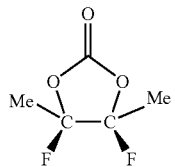

had been produced, and a ratio of trans-form:cis-form was 76:24 (mole %).

This condensed product was subjected to refining with a five-staged Oldershaw type rectifier (Oldershaw column available from Sigma Ardrich).

As a result, the trans-form was obtained at a purity of 99.1% (yield: 60%) as fraction of distillate at 35° C. (3 mmHg), and the cis-form was obtained at a purity of 99.6% (yield: 20%) as fraction of distillate at 52° C. (2 mmHg).

According to NMR and IR analyses of these compounds, it was confirmed from the following identification data that the compounds were trans-form and cis-form, respectively of 1,2-dimethyl-1,2-difluoroethylene carbonate.

Trans-Form:
  $^1$H-NMR (heavy acetone): 1.81 to 2.00 (m:6H)
  $^{19}$F-NMR (heavy acetone): −194.7 to −194.5 (m:2F)
  IR: 1853.8 cm$^{-1}$
Cis-form:
  $^1$H-NMR (heavy acetone): 1.81 to 2.00 (m:6H)
  $^{19}$F-NMR (heavy acetone): −113.9 to −112.4 (m:2F)
  IR: 1853.8 cm$^{-1}$ Synthesis Example 2

Synthesis of 1,2-Diethyl-1,2-Difluoroethylene Carbonate

Reaction was carried out using a 3-liter SUS stainless steel autoclave. Into a reactor were added 3,4-hexanedion (397 g, 3.48 mol) of the formula:

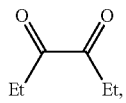

pyridine (138 g, 1.74 mol) and dichloromethane (1 liter), followed by stirring. Then, carbonyl difluoride of the formula:

was introduced at room temperature at 0.1 to 0.5 MPa. It was confirmed that the reaction was followed by heat generation up to 46.2° C. Thereafter, introduction of carbonyl difluoride was continued until heat generation and decrease of pressure could not be recognized, and proceeding of the reaction was traced with GC. After confirming that 3,4-hexanedion as the starting material had disappeared, the reaction was terminated. After completion of the reaction, carbonyl difluoride remaining in the system was purged and then the following post-treatment was carried out. First, the reaction solution was subjected to quenching several times with 1-liter of pure water. Then, an organic layer of the bottom layer was collected and was subjected to quenching again with 1 liter of 1N HCl solution to remove the remaining pyridine. After the quenching, drying was conducted with MgSO$_4$ and the filtrated solution was condensed with an evaporator. In this case, trans-form of the formula:

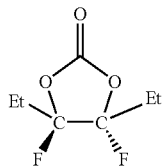

and cis-form of the formula:

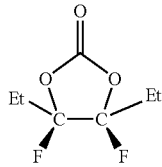

had been produced, and a ratio of trans-form:cis-form was 85:15 (mole %).

This condensed product was subjected to refining with a five-staged Oldershaw type rectifier (Oldershaw column available from Sigma Ardrich).

As a result, the trans-form was obtained at a purity of 99.1% (yield: 70%) as fraction of distillate at 50° C. (3 mmHg), and the cis-form was obtained at a purity of 99.6% (yield: 18%) as fraction of distillate at 70° C. (2 mmHg).

According to NMR and IR analyses of these compounds, it was confirmed from the following identification data that the compounds were trans-form and cis-form, respectively of 1,2-diethyl-1,2-difluoroethylene carbonate.

Trans-Form:
  $^1$H-NMR (heavy acetone): 0.91 to 0.97 (m:6H), 1.61 to 1.85 (m:4H)
  $^{19}$F-NMR (heavy acetone): −194.7 to −194.5 (m:2F)
  IR: 1853.8 cm$^{-1}$
Cis-Form:
  $^1$H-NMR (heavy acetone): 0.91 to 0.97 (m:6H), 1.61 to 1.85 (m:6H)
  $^{19}$F-NMR (heavy acetone): −113.9 to −112.4 (m:2F)
  IR: 1853.8 cm$^{-1}$ Example 1

HCF$_2$CF$_2$CH$_2$OCF$_2$CF$_2$H (IA-1) as the component (I), Cis-1,2-dimethyl-1,2-difluoroethylene carbonate (IIA) as the component (II), ethylene carbonate (IIIA-1) as the component (IIIA) and dimethyl carbonate (IIIB-1) as the component (IIIB) were mixed in a volume % ratio of 40/3/10/47, and to this solvent for dissolving an electrolyte salt was added LiPF$_6$ as an electrolyte salt at a concentration of 1.0 mole/liter, followed by sufficiently stirring at 25° C. to prepare a non-aqueous electrolytic solution of the present invention.

Example 2

A non-aqueous electrolytic solution of the present invention was prepared in the same manner as in Example 1 except that trans-1,2-dimethyl-1,2-difluoroethylene carbonate (IIB) was used as the component (II).

Comparative Example 1

A comparative non-aqueous electrolytic solution was prepared in the same manner as in Example 1 except that HCF$_2$CF$_2$CH$_2$OCF$_2$CF$_2$H (IA-1) as the component (I), ethylene carbonate (IIIA-1) as the component (IIIA) and dimethyl carbonate (IIIB-1) as the component (IIIB) were mixed in a volume % ratio of 40/10/50, and the component (II) was not added.

The following Test 1 was carried out using these non-aqueous electrolytic solutions.
Test 1 (Measurement of Internal Impedance)
(Preparation of Bipolar Cell)

An active material for a positive electrode prepared by mixing LiCoO$_2$, carbon black and polyvinylidene fluoride (trade name KF-1000 available from KUREHA CORPORATION) in a ratio of 90/3/7 (mass percent ratio) was dispersed in N-methyl-2-pyrrolidone to be formed into a slurry which was then uniformly coated on a positive electrode current collector (15 μm thick aluminum foil) and dried to form a layer made of a mixture of positive electrode materials. Then, the coated aluminum foil was subjected to compression molding with a roller press, and after cutting, a lead wire was welded thereto to prepare a strip-like positive electrode.

Separately, a styrene-butadiene rubber dispersed in distilled water was added to artificial graphite powder (trade name MAG-D available from Hitachi Chemical Co., Ltd.) to give a solid content of 6% by mass, followed by mixing with a disperser to be formed into a slurry which was then uniformly coated on a negative electrode current collector (10 μm thick copper foil) and dried to form a layer made of a mixture of negative electrode materials. Then, the coated copper foil was subjected to compression molding with a roller press, and after cutting and drying, a lead wire was welded thereto to prepare a strip-like negative electrode.

The above strip-like positive electrode and negative electrode were cut into a size of 16 mm diameter, and a 20 μm thick microporous polyethylene film was cut into a size of 25 mm diameter to make a separator. These were combined and set as shown in a diagrammatic longitudinal cross-sectional view of FIG. 1 to make a bipolar cell. In FIG. 1, numeral 1 is a positive electrode; numeral 2 is a negative electrode; numeral 3 is a separator; numeral 4 is a positive electrode terminal; and numeral 5 is a negative electrode terminal. Then, 2 ml each of the electrolytic solutions prepared in Examples 1 and 2 and Comparative Example 1 was put in this cell, and the cell was sealed. A capacity of the cell was 3 mAh. After the electrolytic solution had been sufficiently penetrated in the separator, etc., chemical conversion treatment was carried out to make a bipolar cell.

(AC Impedance Method)

In measurement of AC impedance, the bipolar cell was charged (SOC=100%) at 1.0 C at 4.2 V until a charging current reached 1/10 C. Then, an internal impedance of the cell was measured with a frequency analyzer (model 1260 available from Solartron Public Company Limited) and a potentio/galvanostat (model 1287 available from Solartron Public Company Limited). Measuring conditions were such that amplitude was ±10 mV and frequency was from 0.1 Hz to 2 kHz.

The obtained measured internal impedance was plotted. A real part (Re Z) and an imaginary part (Im Z) of the internal impedance value (Ω) were plotted on an X-axis and a Y-axis, respectively of a graph to make Cole-Cole plot which was as shown in FIG. 2.

Figure 2:
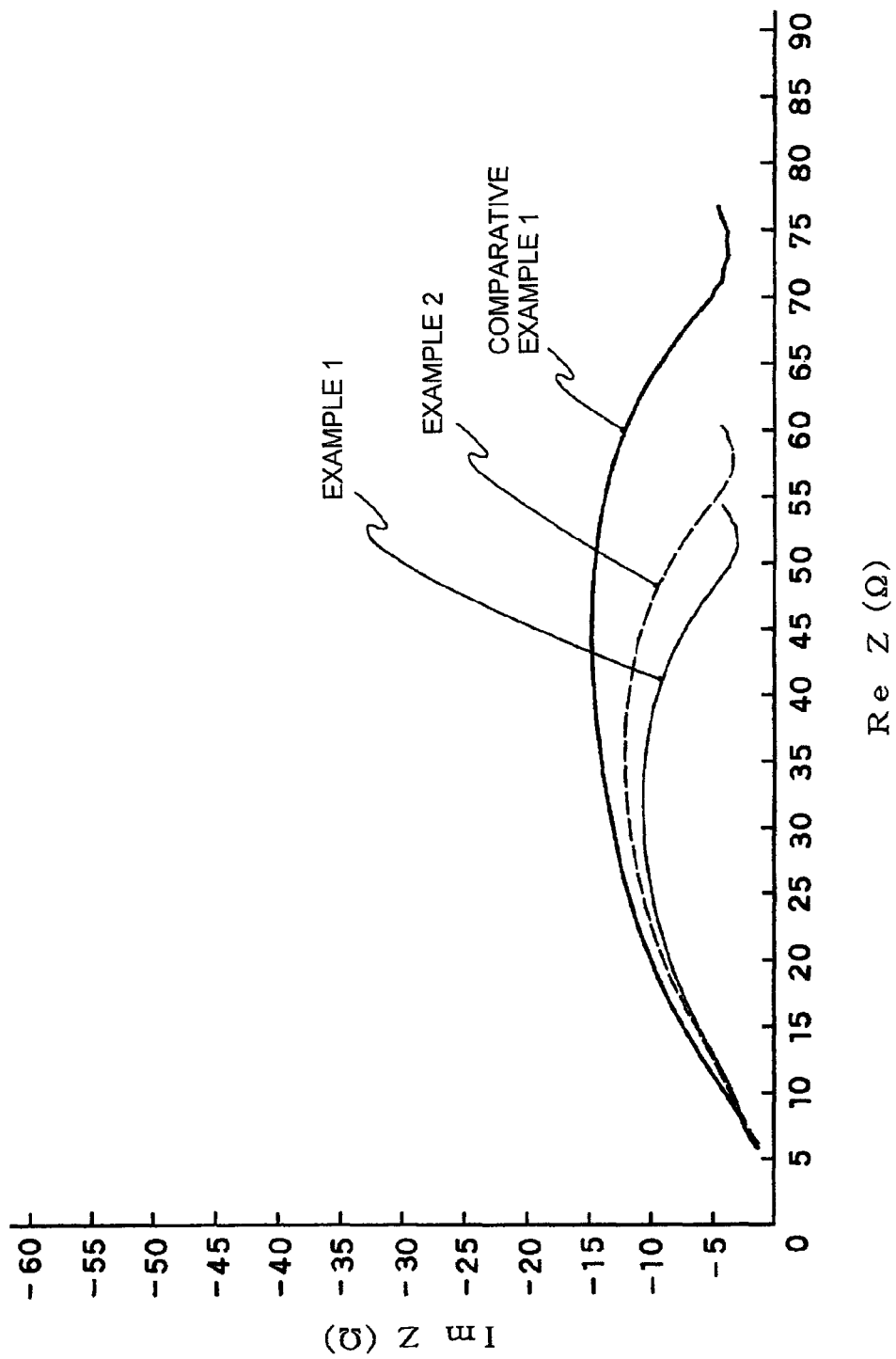
FIG. 2 is a graph of Cole-Cole plot of internal impedance measured in Test 1. It is seen that semi-circular parts of Examples 1 and 2 are small and resistance is small.

From the results shown in FIG. 2, it is seen that semi-circular parts of the bipolar cells of Examples 1 and 2 are smaller than a semi-circular part of the bipolar cell of Comparative Example 1, which indicates that resistance is small.

Test 2 (Measurement of Calorific Value)

Figure 3:
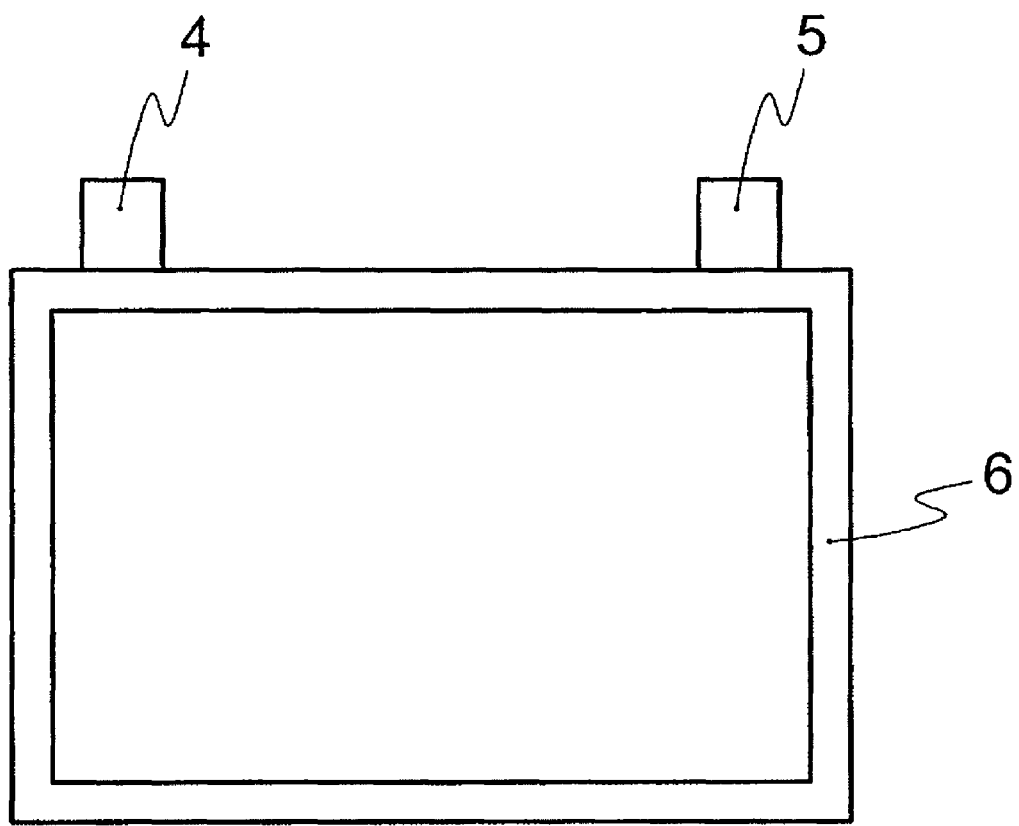
FIG. 3 is a diagrammatic plan view of the laminated cell prepared in Test 2.

As shown in the diagrammatic plan view of FIG. 3, the above strip-like positive electrode was cut into a size of 40 mm×72 mm (with a 10 mm×10 mm positive electrode terminal), and the above strip-like negative electrode was cut into a size of 42 mm×74 mm (with a 10 mm×10 mm negative electrode terminal). A lead wire was welded to each terminal. A 20 μm thick microporous polyethylene film was cut into a size of 78 mm×46 mm to make a separator, and the positive electrode and negative electrode were set so as to sandwich the separator between them. These were put in the aluminum-laminated casing 6 as shown in FIG. 3, and then 2 ml each of the electrolytic solutions prepared in Example 1 and Comparative Example 1 was poured into the casing 6, followed by sealing to make a laminated cell having a capacity of 72 mAh.

Charge/discharge cycle was such that charging of the cell was continued at 1.0 C at 4.2 V until a charging current reached 1/10 C, discharging was continued at a current equivalent to 0.2 C until 3.0 V was reached, and subsequently, charging of the cell was continued at 1.0 C at 4.2 V until a charging current reached 1/10 C.

After charging and discharging, the laminated cell was disassembled in a glow box, and the positive electrode was taken out. The positive electrode and 0.5 ml of the electrolytic solution of Example 1 or Comparative Example 1 were put in a cell for measurement of calorific value to make a calorific value measuring cell.

The calorific value measuring cell was set on a calorimeter C80 available from Setaram Instrumentation, and the cell was heated up from 100° C. to 250° C. at a temperature elevating rate of 0.5° C./min to measure calorific value. The results are shown in FIG. 4.

Figure 4:
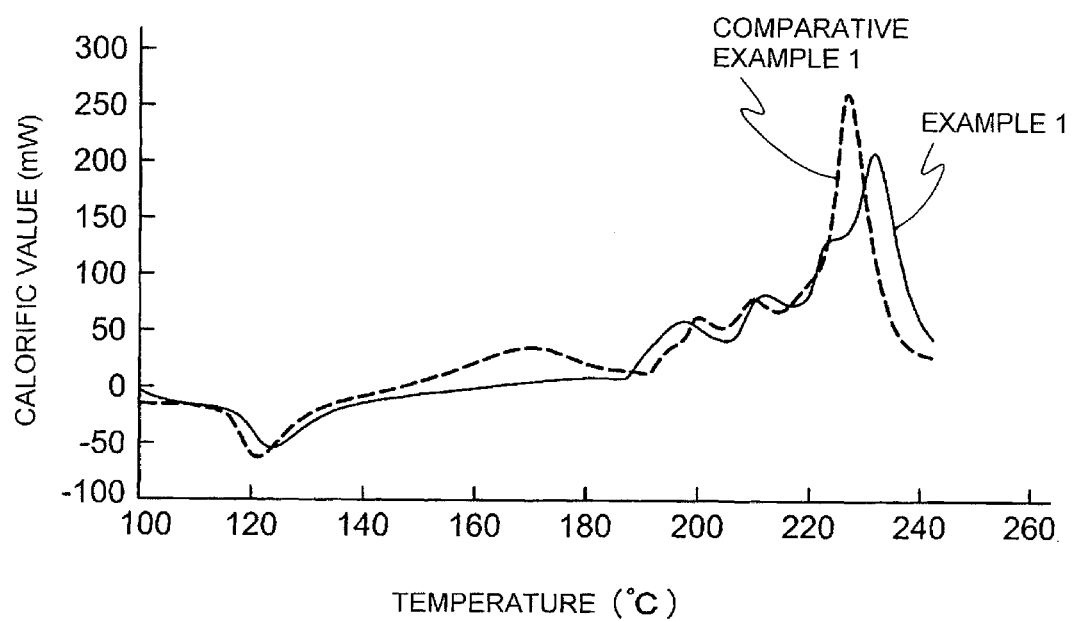
FIG. 4 is a graph showing a relation between temperature (° C.) and calorific value (heat flow: mW) measured in Test 2. It is seen that the heat generation starting temperature of Example 1 is higher.

From the results shown in FIG. 4, when comparing the electrolytic solution of Example 1 with the electrolytic solution of Comparative Example 1, it is seen that the electrolytic solution of Example 1 is safe since its heat generation starting temperature is higher and the total calorific value is decreased.

Example 3

A non-aqueous electrolytic solution of the present invention was prepared in the same manner as in Example 1 except that cis-1,2-diethyl-1,2-difluoroethylene carbonate (IIC) was used as the component (II).

Examples 4 to 10

Non-aqueous electrolytic solutions of the present invention were prepared in the same manner as in Example 1 except that kinds and amounts of the component (I), component (II), component (IIIA) and component (IIIB) shown in Table 1 were used.

Any of the obtained solvents for dissolving an electrolyte salt were low in viscosity, and mixing thereof with an electrolyte salt was easy.

Comparative Example 2

A comparative non-aqueous electrolytic solution was prepared in the same manner as in Example 4 except that the component (I) was not added, and cis-1,2-dimethyl-1,2-difluoroethylene carbonate (IIA) as the component (II), ethylene carbonate (IIIA-1) as the component (IIIA) and dimethyl carbonate (IIIB-1) as the component (IIIB) were mixed in a volume % ratio of 3/27/70.

Comparative Example 3

A comparative non-aqueous electrolytic solution was prepared in the same manner as in Example 4 except that 1,1-difluoroethylene carbonate (IVA) was used instead of the component (II).

Test 3 (Measurement of Battery Characteristics)

A cylindrical secondary battery was made by the following method.

The strip-like positive electrode made in Test 1 was placed on the strip-like negative electrode made in Test 1 with a 20 μm thick microporous polyethylene film (separator) being sandwiched between them, followed by winding spirally to make a laminated electrode of spiral-wound structure. In this case, winding was carried out so that the rough surface of the positive electrode current collector faces outward. After this, the laminated electrode was put in a cylindrical bottomed battery case having an outer diameter of 18 mm, and welding of lead wires for the positive electrode and negative electrode was carried out.

Then, electrolytic solutions prepared in Examples 1 to 10 and Comparative Examples 1 to 3 were poured into the battery case, and after the electrolytic solution had been sufficiently penetrated in the separator, etc., sealing of the case, pre-charging and aging were carried out to make cylindrical lithium secondary batteries.

Discharge capacity, rate characteristic, cycle characteristic and safety at over-charging of these lithium secondary batteries were measured. The results are shown in Table 1.

(Discharge Capacity)

When a charge/discharge current is represented by C and 1 C is assumed to be 1,800 mA, discharge capacity is measured under the following charge/discharge measuring conditions. Discharge capacity is indicated by an index, assuming the discharge capacity of Comparative Example 1 to be 100.

Charge and Discharge Conditions

Charging: Charging is continued at 1.0 C at 4.2 V until a charging current reaches 1/10 C (CC·CV charge).

Discharging: 1 C, 3.0 V cut (CC discharge)

(Rate Characteristic)

Charging is continued at 1.0 C at 4.2 V until a charging current reaches 1/10 C, and discharging is continued at a current equivalent to 0.2 C until 3.0 V is reached, and then discharge capacity is determined. Subsequently, charging is continued at 1.0 C at 4.2 V until a charging current reaches 1/10 C, and discharging is continued at a current equivalent to 2 C until 3.0 V is reached, and then discharge capacity is determined. The discharge capacity at 2 C and the discharge capacity at 0.2 C are substituted in the following equation to obtain a rate characteristic.

Rate characteristic (%)=Discharge capacity (mAh) at 2 C/Discharge capacity (mAh) at 0.2 C×100

(Cycle Characteristic)

Charge and discharge cycle to be conducted under the above-mentioned charge and discharge conditions (Charging is continued at 1.0 C at 4.2 V until a charging current reaches 1/10 C, and discharging is continued at a current equivalent to 1 C until 3.0 V is reached) is assumed to be one cycle, and discharge capacity after the first cycle and discharge capacity after the hundredth cycle are measured. Cycle characteristic is represented by a cycle maintenance factor obtained by the following equation.

Cycle maintenance factor (%)=Discharge capacity (mAh) after the hundredth cycle/Discharge capacity (mAh) after the first cycle×100

(Over-Charge Test 1)

The cylindrical batteries of Examples and Comparative Examples are discharged at a current equivalent to 1 CmA until 3.0 V is reached, and over-charging is carried out at a current equivalent to 3 CmA up to an upper limit voltage of 12 V, and whether or not firing or bursting occurs is examined. When firing or bursting occurs, it is shown by x, and when neither firing nor bursting occurs, it is shown by ○.

[Over-Charge Test 2]

After the cylindrical batteries of Examples and Comparative Examples are discharged up to 3.0 V at a current equivalent to 1 CmA, the batteries are wound with glass wool, and then over-charging is carried out at a current equivalent to 1 CmA up to an upper limit voltage of 12 V, and whether firing or bursting occurs is examined. When firing or bursting occurs, it is shown by X, and when neither firing nor bursting occurs, it is shown by ○.

TABLE 1

| | Example | | | | | | |
|---|---|---|---|---|---|---|---|
| | 1 | 2 | 3 | 4 | 5 | 6 | 7 |
| Electrolytic solution | | | | | | | |
| Solvent components | | | | | | | |
| Component (I) | | | | | | | |
| Kind | IA-1 | IA-1 | IA-1 | IA-1 | IA-1 | IA-1 | IA-1 |
| Proportion (volume %) | 40 | 40 | 40 | 40 | 40 | 40 | 40 |
| Component (II) | | | | | | | |
| Kind | IIA | IIB | IIC | IIA | IIA | IIA | IIA |
| Proportion (volume %) | 3 | 3 | 3 | 3 | 3 | 3 | 3 |
| Component (IIIA) | | | | | | | |
| Kind | IIIA-1 | IIIA-1 | IIIA-1 | IIIA-1 | IIIA-1 + IIIA-2 | IIIA-1 | IIIA-1 |
| Proportion (volume %) | 10 | 10 | 10 | 20 | 20 + 10 | 20 | 20 |
| Component (IIIB) | | | | | | | |
| Kind | IIIB-1 | IIIB-1 | IIIB-1 | IIIB-1 | IIIB-1 | IIIB-2 | IIIB-3 |
| Proportion (volume %) | 47 | 47 | 47 | 37 | 27 | 37 | 37 |
| Component (IV) | | | | | | | |
| Kind | — | — | — | — | — | — | — |
| Proportion (volume %) | — | — | — | — | — | — | — |
| Electrolyte salt (concentration mole/liter) | | | | | | | |
| $LiPF_6$ | 1.0 | 1.0 | 1.0 | 1.0 | 1.0 | 1.0 | 1.0 |
| Discharge capacity (index) | 105.0 | 104.5 | 103.6 | 110.0 | 109.4 | 107.2 | 105.0 |
| Rate characteristic (%) | 92.0 | 91.8 | 91.2 | 96.0 | 91.8 | 95.5 | 92.8 |
| Cycle characteristic (%) | 91.0 | 90.6 | 90.0 | 94.0 | 90.5 | 94.5 | 95.1 |
| Over-charge test 1 | ○ | ○ | ○ | ○ | ○ | ○ | ○ |
| Over-charge test 2 | ○ | ○ | ○ | ○ | ○ | ○ | ○ |

TABLE 1-continued

|  | Example | | | Comparative Example | | |
|---|---|---|---|---|---|---|
|  | 8 | 9 | 10 | 1 | 2 | 3 |
| Electrolytic solution Solvent components Component (I) | | | | | | |
| Kind | IA-1 | IA-1 | IA-1 | IA-1 | — | IA-1 |
| Proportion (volume %) | 40 | 40 | 40 | 40 | — | 40 |
| Component (II) | | | | | | |
| Kind | IIA | IIA | IIA | — | IIA | — |
| Proportion (volume %) | 3 | 3 | 3 | — | 3 | — |
| Component (IIIA) | | | | | | |
| Kind | IIIA-1 | IIIA-1 | IIIA-1 | IIIA-1 | IIIA-1 | IIIA-1 |
| Proportion (volume %) | 20 | 20 | 20 | 10 | 27 | 20 |
| Component (IIIB) | | | | | | |
| Kind | IIIB-1 + IIIB-2 | IIIB-1 + IIIB-3 | IIIB-2 + IIIB-3 | IIIB-1 | IIIB-1 | IIIB-1 |
| Proportion (volume %) | 20 + 17 | 20 + 17 | 20 + 17 | 50 | 70 | 37 |
| Component (IV) | | | | | | |
| Kind | — | — | — | — | — | IVA |
| Proportion (volume %) | — | — | — | — | — | 3 |
| Electrolyte salt (concentration mole/liter) | | | | | | |
| $LiPF_6$ | 1.0 | 1.0 | 1.0 | 1.0 | 1.0 | 1.0 |
| Discharge capacity (index) | 108.5 | 107.6 | 106.5 | 100.0 | 103.0 | 92.0 |
| Rate characteristic (%) | 95.8 | 94.4 | 94.2 | 89.0 | 92.0 | 81.0 |
| Cycle characteristic (%) | 94.3 | 94.5 | 94.8 | 89.5 | 88.2 | 84.5 |
| Over-charge test 1 | ○ | ○ | ○ | ○ | X | ○ |
| Over-charge test 2 | ○ | ○ | ○ | X | X | X |

From the results shown in Table 1, it is seen that in the cases of adding 1,2-dimethyl-1,2-difluoroethylene carbonate, discharge capacity, rate characteristic and cycle characteristic are improved as compared with Comparative Example 1 where 1,2-dimethyl-1,2-difluoroethylene carbonate is not added. Also, it is seen that there is a large effect of improving discharge capacity, rate characteristic and cycle characteristic as compared with Comparative Example 2 where the component (I) is not blended and Comparative Example 3 where 1,1-difluoroethylene carbonate is blended. Further, from the results of the overcharge test, it is seen that safety is further improved.

Further, when comparing trans-1,2-dimethyl-1,2-difluoroethylene carbonate (Example 2) with cis-1,2-dimethyl-1,2-difluoroethylene carbonate (Example 1), it is seen that an effect of improving discharge capacity, rate characteristic and cycle characteristic is larger in the case of using cis-1,2-dimethyl-1,2-difluoroethylene carbonate (Example 1). From the results of the overcharge test, it is also seen that safety is further improved.

Also, it is seen that the same effect is exhibited when using 1,2-diethyl-1,2-difluoroethylene carbonate (Example 3).

Example 11

A non-aqueous electrolytic solution of the present invention was prepared in the same manner as in Example 1 except that $HCF_2CF_2CH_2OCF_2CFHCF_3$ (IA-2) was used as the component (I).

Example 12

A non-aqueous electrolytic solution of the present invention was prepared in the same manner as in Example 1 except that $CF_3CF_2CH_2OCF_2CF_2H$ (IA-3) was used as the component (I).

Example 13

A non-aqueous electrolytic solution of the present invention was prepared in the same manner as in Example 1 except that $CF_3COOCH_2CF_2CF_2H$ (IB-1) was used as the component (I).

Example 14

A non-aqueous electrolytic solution of the present invention was prepared in the same manner as in Example 1 except that $CF_3CH_2OCOOCH_2CF_3$ (IC-1) was used as the component (I).

Examples 15 to 17

Non-aqueous electrolytic solutions of the present invention were prepared in the same manner as in Example 1 except that $LiN(O_2SCF_3)_2$ (VB) (Example 15), $LiN(O_2SC_2F_5)_2$ (VC) (Example 16) and $LiBF_4$ (VD) (Example 17) were used as an electrolyte salt instead of $LiPF_6$ (VA).

Examples 18 to 21

Non-aqueous electrolytic solutions of the present invention were prepared in the same manner as in Example 1 except that the component (I), component (II), component (IIIA) and component (IIIB) were used in amounts shown in Table 2.

The above-mentioned Test 3 was carried out using these non-aqueous electrolytic solutions. The results are shown in Table 2.

TABLE 2

| | Example | | | | | |
|---|---|---|---|---|---|---|
| | 11 | 12 | 13 | 14 | 15 | 16 |
| Electrolytic solution Solvent components Component (I) | | | | | | |
| Kind | IA-2 | IA-3 | IB-1 | IC-1 | IA-1 | IA-1 |
| Proportion (volume %) | 40 | 40 | 40 | 40 | 40 | 40 |
| Component (II) | | | | | | |
| Kind | IIA | IIA | IIA | IIA | IIA | IIA |
| Proportion (volume %) | 3 | 3 | 3 | 3 | 3 | 3 |
| Component (IIIA) | | | | | | |
| Kind | IIIA-1 | IIIA-1 | IIIA-1 | IIIA-1 | IIIA-1 | IIIA-1 |
| Proportion (volume %) | 20 | 20 | 20 | 20 | 20 | 20 |
| Component (IIIB) | | | | | | |
| Kind | IIIB-1 | IIIB-1 | IIIB-1 | IIIB-1 | IIIB-1 | IIIB-1 |
| Proportion (volume %) | 37 | 37 | 37 | 37 | 27 | 37 |
| Electrolyte salt (concentration mole/liter) | | | | | | |
| $LiPF_6$ | 1.0 | 1.0 | 1.0 | 1.0 | — | — |
| $LiN(O_2SCF_3)_2$ | — | — | — | — | 1.0 | — |
| $LiN(O_2SC_2F_5)_2$ | — | — | — | — | — | 1.0 |
| $LiBF_4$ | — | — | — | — | — | — |
| Discharge capacity (index) | 108.5 | 107.0 | 108.2 | 107.0 | 107.3 | 106.9 |
| Rate characteristic (%) | 95.6 | 95.2 | 93.8 | 91.3 | 95.8 | 95.4 |
| Cycle characteristic (%) | 92.2 | 91.5 | 75.2 | 87.2 | 93.5 | 93.7 |
| Over-charge test 1 | ◯ | ◯ | ◯ | ◯ | ◯ | ◯ |
| Over-charge test 2 | ◯ | ◯ | ◯ | ◯ | ◯ | ◯ |

| | Example | | | | |
|---|---|---|---|---|---|
| | 17 | 18 | 19 | 20 | 21 |
| Electrolytic solution Solvent components Component (I) | | | | | |
| Kind | IA-1 | IA-1 | IA-1 | IA-1 | IA-1 |
| Proportion (volume %) | 40 | 10 | 60 | 40 | 40 |
| Component (II) | | | | | |
| Kind | IIA | IIA | IIA | IIA | IIA |
| Proportion (volume %) | 3 | 3 | 3 | 0.5 | 30 |
| Component (IIIA) | | | | | |
| Kind | IIIA-1 | IIIA-1 | IIIA-1 | IIIA-1 | IIIA-1 |
| Proportion (volume %) | 20 | 30 | 10 | 20 | 10 |
| Component (IIIB) | | | | | |
| Kind | IIIB-1 | IIIB-1 | IIIB-1 | IIIB-1 | IIIB-1 |
| Proportion (volume %) | 37 | 57 | 27 | 39.5 | 20 |
| Electrolyte salt (concentration mole/liter) | | | | | |
| $LiPF_6$ | — | 1.0 | 1.0 | 1.0 | 1.0 |
| $LiN(O_2SCF_3)_2$ | — | — | — | — | — |
| $LiN(O_2SC_2F_5)_2$ | — | — | — | — | — |
| $LiBF_4$ | 1.0 | — | — | — | — |
| Discharge capacity (index) | 105.2 | 110.2 | 105.8 | 103.2 | 105.4 |
| Rate characteristic (%) | 94.8 | 96.2 | 95.2 | 92.0 | 94.2 |
| Cycle characteristic (%) | 92.1 | 93.6 | 92.6 | 93.1 | 93.0 |
| Over-charge test 1 | ◯ | ◯ | ◯ | ◯ | ◯ |
| Over-charge test 2 | ◯ | ◯ | ◯ | ◯ | ◯ |

From the results shown in Table 2, it is seen that in the case of using 1,2-dimethyl-1,2-difluoroethylene carbonate, discharge capacity, rate characteristic and cycle characteristic are improved even if other fluorine-containing ethers are used (Examples 11 and 12) instead of the fluorine-containing ether (IA-1), kind of an electrolyte salt is changed (Examples 15 to 17), and an amount of fluorine-containing ether or 1,2-dimethyl-1,2-difluoroethylene carbonate is changed (Examples 18 to 21). Also, it is seen that in the case of using fluorine-containing ester (Example 13) or fluorine-containing chain carbonate (Example 14), both of discharge capacity and rate characteristic are improved. Also, from the results of over-charge test, it is seen that safety is also further improved.

Industrial Applicability

According to the present invention, specifically 1,2-dialkyl-1,2-difluoroethylene carbonate (II) is hardly hydrolyzed, and by using this 1,2-dialkyl-1,2-difluoroethylene carbonate (II) together with the fluorine-containing solvent (I)

and other carbonates (III) such as the non-fluorine-containing cyclic carbonate (IIIA) and the non-fluorine-containing chain carbonate (IIIB), a lithium secondary battery having specifically excellent discharge capacity, rate characteristic and cycle characteristic is provided, and also there can be provided a solvent for dissolving an electrolyte salt having improved incombustibility (safety), an electrolytic solution using the solvent and further a lithium secondary battery.

The invention claimed is:

1. A solvent for dissolving an electrolyte salt of lithium secondary battery comprising at least one fluorine-containing solvent (I) selected from the group consisting of a fluorine-containing ether, a fluorine-containing ester and a fluorine-containing chain carbonate, 1,2-dialkyl-1,2-difluoroethylene carbonate (II) and other carbonate (III).

2. The solvent of claim 1, wherein the fluorine-containing solvent (I) is at least one selected from the group consisting of:

a fluorine-containing ether represented by the formula (IA):

Rf$^1$ORf$^2$ wherein Rf$^1$ is a fluorine-containing alkyl group having 3 to 6 carbon atoms, Rf$^2$ is a fluorine-containing alkyl group having 2 to 6 carbon atoms, a fluorine-containing ester represented by the formula (IB):

Rf$^3$COORf$^4$ wherein Rf$^3$ is an alkyl group which has 1 to 2 carbon atoms and may have fluorine atom, Rf$^4$ is an alkyl group which has 1 to 4 carbon atoms and may have fluorine atom, at least either Rf$^3$ or Rf$^4$ is a fluorine-containing alkyl group, and a fluorine-containing chain carbonate represented by the formula (IC):

Rf$^5$OCOORf$^6$ wherein Rf$^5$ is a fluorine-containing alkyl group having 1 to 4 carbon atoms, Rf$^6$ is an alkyl group which has 1 to 4 carbon atoms and may have fluorine atom.

3. The solvent of claim 1, wherein the other carbonate (III) is a non-fluorine-containing cyclic carbonate (IIIA) and a non-fluorine-containing chain carbonate (IIIB).

4. The solvent of claim 3, wherein the non-fluorine-containing cyclic carbonate (IIIB) is one of ethylene carbonate and propylene carbonate or a mixture thereof.

5. The solvent of claim 3, wherein the non-fluorine-containing chain carbonate (IIIB) is one of dimethyl carbonate, methyl ethyl carbonate and diethyl carbonate or a mixture thereof.

6. The solvent of any of claim 1, wherein the 1,2-dialkyl-1,2-difluoroethylene carbonate (II) is 1,2-dimethyl-1,2-difluoroethylene carbonate.

7. The solvent of claim 6, wherein the 1,2-dimethyl-1,2-difluoroethylene carbonate (II) is cis-form.

8. The solvent of claim 6, wherein the 1,2-dimethyl-1,2-difluoroethylene carbonate (II) is trans-form.

9. The solvent of claim 1, wherein assuming that the total amount of (I), (II) and (III) is 100% by volume, the fluorine-containing ether (I) is contained in an amount of 10 to 60% by volume and the 1,2-dialkyl-1,2-difluoroethylene carbonate (II) is contained in an amount of not more than 30% by volume.

10. The solvent of claim 3, wherein assuming that the total amount of (I), (II), (IIIA) and (IIIB) is 100% by volume, (I) is contained in an amount of 10 to 60% by volume, (II) is contained in an amount of 0.1 to 10% by volume, (IIIA) is contained in an amount of 10 to 50% by volume and (IIIB) is contained in an amount of 0 to 79.9% by volume.

11. A non-aqueous electrolytic solution of lithium secondary battery comprising the solvent for dissolving an electrolyte salt of claim 1 and an electrolyte salt.

12. A lithium secondary battery using the non-aqueous electrolytic solution of claim 11.

* * * * *